(12) United States Patent
Lin

(10) Patent No.: US 11,272,488 B2
(45) Date of Patent: Mar. 8, 2022

(54) UPLINK CONTROL CHANNEL TRANSMISSION METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventor: Yanan Lin, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/847,549

(22) Filed: Apr. 13, 2020

(65) Prior Publication Data

US 2020/0245323 A1    Jul. 30, 2020

Related U.S. Application Data

(63) Continuation of application No. PCT/CN2017/107907, filed on Oct. 26, 2017.

(51) Int. Cl.
*H04W 72/04* (2009.01)
*H04L 1/18* (2006.01)

(52) U.S. Cl.
CPC ....... *H04W 72/0413* (2013.01); *H04L 1/1812* (2013.01); *H04W 72/042* (2013.01)

(58) Field of Classification Search
CPC ............ H04W 72/0413; H04W 72/042; H04L 1/1812
See application file for complete search history.

(56) References Cited

U.S. PATENT DOCUMENTS

2011/0243066 A1    10/2011    Nayeb Nazar
2016/0183244 A1    6/2016    Papasakellariou
(Continued)

FOREIGN PATENT DOCUMENTS

CN    104580036 A    4/2015
CN    107005374 A    8/2017
(Continued)

OTHER PUBLICATIONS

International Search Report in the international application No. PCT/CN2017/107907, dated Dec. 29, 2017.
(Continued)

*Primary Examiner* — Ronald B Abelson
(74) *Attorney, Agent, or Firm* — Perkins Coie LLP

(57) ABSTRACT

An uplink control channel transmission method, a terminal device and a network device are provided. The terminal device determines, according to the maximum code rate at which an uplink control channel is transmitted, uplink control information carried in the uplink control channel; and optimization can be performed according to different uplink control information to ensure reliable transmission of the uplink control information. The method comprises: the terminal device determines, from the maximum code rate of at least one uplink control channel, the maximum code rate at which the uplink control channel is transmitted; and the terminal device determines, according to the maximum code rate at which the uplink control channel is transmitted, uplink control information carried in the uplink control channel.

18 Claims, 2 Drawing Sheets

(56) References Cited

U.S. PATENT DOCUMENTS

| | | | |
|---|---|---|---|
| 2016/0295573 A1 | 10/2016 | Lee | |
| 2017/0013612 A1 | 1/2017 | Nayeb Nazar et al. | |
| 2017/0245262 A1 | 8/2017 | Nayeb Nazar et al. | |
| 2017/0318575 A1 | 11/2017 | Park et al. | |
| 2018/0302896 A1 | 10/2018 | Nayeb Nazar et al. | |
| 2019/0349918 A1 | 11/2019 | Nayeb Nazar et al. | |
| 2020/0288458 A1* | 9/2020 | Takeda | H04W 72/04 |

FOREIGN PATENT DOCUMENTS

| | | | |
|---|---|---|---|
| CN | 107005391 A | 8/2017 | |
| CN | 107104780 A | 8/2017 | |
| CN | 107113147 A | 8/2017 | |
| EP | 3242435 A1 | 11/2017 | |
| JP | 2017-092614 A | 5/2017 | |
| KR | 10-2012-0093912 A | 8/2012 | |
| WO | 2016163855 A1 | 10/2016 | |
| WO | 2019077727 A1 | 4/2019 | |

OTHER PUBLICATIONS

3GPP TS 38.212 V1.0.0 (Sep. 2017), 3rd Generation Partnership Project Technical Specification Group Radio Access Network NR, Multiplexing and channel coding (Release 15).

3GPP TS 38.213 V1.0.0 (Sep. 2017), 3rd Generation Partnership Project Technical Specification Group Radio Access Network NR, Physical layer procedures for control (Release 15).

3GPP TS 38.331 V0.0.5 (Aug. 2017), 3rd Generation Partnership Project Technical Specification Group Radio Access Network NR, Radio Resource Control (RRC) Protocol specification (Release 15).

NTT Docomo et al: "UE behavior for simul taneous transmission of P-CSI and HARQ-ACK/SR" 3GPP Draft: R1-157231. 3rd Generation Partnership Project (3GPP), Mobile Competence Centre: 650, Route Des Lucioles: F-06921 Sophia-Antipolis Cedex; France, vol. RAN WG1, No. Anaheim, USA; Nov. 15, 2015-Nov. 22, 2015, Nov. 15, 2015 (Nov. 15, 2015), XP051003454, p. 4, line 1-p. 4, line 8.

Supplementary European Search Report in the European application No. 17930023.1, dated Sep. 2, 2020.

Written Opinion of the International Search Authority in the international application No. PCT/CN2017/107907, dated Dec. 29, 2017.

First Office Action of the European application No. 17930023.1, dated May 31, 2021. 8 pages.

First Office Action of the Chinese application No. 202010451412.2, dated Jun. 15, 2021. 12 pages.

Office Action of the Indian application No. 202017021613, dated Nov. 15, 2021 6 pages with English translation.

First Office Action of the Korean application No. 10-2020-7012399, dated Oct. 25, 2021 11 pages with English translation.

Nokia Networks, "Periodic CSI reporting for Carrier Aggregation Enhancement Beyond 5 Carriers", 3GPPTSG-RAN WG1#83 R1-157128, Internet <URL: http://www.3gpp.org/ftp/tsg_ran/WG1_RL1/TSGR1_83/Docs/R1-157128.zip>, Nov. 6, 2015. 3 pages.

ETRI, "Short-PUCCH for UCI of up to 2 bits", 3GPP TSG RAN WGI adhoc NR AH 1706 R1-1710618, Internet: <URL http://www.3gpp.org/ftp/tsg_ran/WG1_RL1/TSGR1_AH/NR_AH_1706/Docs/R1-1710618.zip>, Jun. 17, 2017. 6 pages.

First Office Action of the Japanese application No. 2020-522997, dated Oct. 1, 2021 10 pages with English translation.

Second Office Action of the Chinese application No. 202010451412.2, dated Sep. 18, 2021. 10 pages with English translation.

Decision of Refusal of the Chinese application No. 202010451412.2, dated Dec. 20, 2021. 9 pages with English translation.

Second Office Action of the European application No. 17930023.1, dated Dec. 20, 2021. 6 pages.

* cited by examiner

UPLINK CONTROL CHANNEL TRANSMISSION METHOD, TERMINAL DEVICE AND NETWORK DEVICE

CROSS-REFERENCE TO RELATED APPLICATIONS

This is a continuation application of International Patent Application No. PCT/CN2017/107907, filed on Oct. 26, 2017, the contents of which are hereby incorporated by reference in its entirety.

BACKGROUND

In a 5th-Generation (5G) New Radio (NR) communication system, a transmission resource of a PUCCH may be flexibly configured within a certain range, and meanwhile, Uplink Control Information (UCI) required to be transmitted at a certain moment also dynamically changes. However, when UCI that dynamically changes is transmitted on a PUCCH resource that is limited in flexibility, it is difficult to ensure that a transmission bit rate of a PUCCH meets a demodulation requirement. For example, an extreme case is that a relatively small PUCCH bears multi-bit UCI and thus a bit rate of the UCI is greater than 1. In such case, the UCI can not be correctly demodulated by a network device (for example, a base station).

Therefore, how to reliably transmit UCI in a 5G NR system is a problem urgent to be solved.

SUMMARY

The disclosure relates to the field of communication, and more particularly, to a Physical Uplink Control Channel (PUCCH) transmission methods, a terminal device and a network device.

The terminal device determines UCI born in a PUCCH according to a maximum code rate for transmission of the PUCCH and can implement optimization according to different UCI to ensure reliable transmission of the UCI.

According to some embodiments, there is provided a method for Physical Uplink Control Channel (PUCCH) transmission, comprising: obtaining, by a terminal device, a maximum code rate, wherein the maximum code rate is one of at least two maximum code rates configured for PUCCH transmission; and transmitting, by the terminal device, Uplink Control Information (UCI) in a PUCCH according to the maximum code rate.

According to some embodiments, there is provided method for Physical Uplink Control Channel (PUCCH) transmission, comprising: configuring, by a network device, a maximum code rate for a terminal device, wherein the maximum code rate is one of at least two maximum code rates configured for PUCCH transmission; and receiving, by the network device, Uplink Control Information (UCI) transmitted by the terminal device in a PUCCH according to the maximum code rate According to some embodiments, there is provided a terminal device, comprising: a processor, configured to obtain a maximum code rate, wherein the maximum code rate is one of at least two maximum code rates configured for PUCCH transmission, wherein the processor is further configured to transmit Uplink Control Information (UCI) in a PUCCH according to the maximum code rate

DETAILED DESCRIPTION

Figure 1:
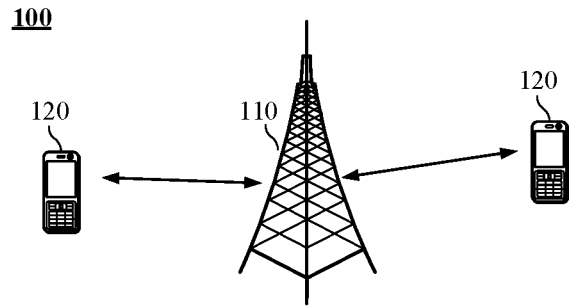
FIG. 1 illustrates a wireless communication system to which at least some embodiments of the disclosure are applied.

The technical solutions in at least some embodiments of the disclosure will be clearly and completely described below in combination with the drawings in at least some embodiments of the disclosure.

The technical solutions of at least some embodiments of the disclosure may be applied to a Long Term Evolution (LTE) system, an LTE Frequency Division Duplex (FDD) system, LTE Time Division Duplex (TDD), a Universal Mobile Telecommunication System (UMTS), a Worldwide Interoperability for Microwave Access (WiMAX) communication system or a 5G NR communication system, etc.

According to at least some embodiments, there are provided the following solutions.

According to a first aspect, at least some embodiments of the disclosure provide a PUCCH transmission method, which may include the following operations.

A terminal device determines a maximum code rate for transmission of a PUCCH from at least one maximum code rate of the PUCCH.

The terminal device determines UCI born in the PUCCH according to the maximum code rate for transmission of the PUCCH.

In such a manner, in the PUCCH transmission method of at least some embodiments of the disclosure, the terminal device may determine the UCI born in the PUCCH according to the maximum code rate for transmission of the PUCCH, so that the terminal device may transmit the PUCCH within a controllable bit rate range, reliable transmission of the UCI born in the PUCCH may further be ensured, and meanwhile, system transmission efficiency may be improved.

Optionally, in an implementation mode of the first aspect, the operation that the terminal device determines the maximum code rate for transmission of the PUCCH from the at least one maximum code rate of the PUCCH may include the following operation.

The terminal device determines one maximum code rate for transmission of the PUCCH from the at least one maximum code rate of the PUCCH, all the UCI born in the PUCCH corresponding to one maximum code rate.

In such a manner, in the PUCCH transmission method of at least some embodiments of the disclosure, the terminal device transmits the PUCCH according to the maximum code rate meeting all the UCI, so that reliable transmission of all the UCI may be ensured.

Optionally, in an implementation mode of the first aspect, the operation that the terminal device determines the maximum code rate for transmission of the PUCCH from the at least one maximum code rate of the PUCCH may include the following operation.

The terminal device determines multiple maximum code rates for transmission of the PUCCH from the at least one maximum code rate of the PUCCH, multiple types of UCI born in the PUCCH corresponding to multiple maximum code rates respectively.

In such a manner, in the PUCCH transmission method of at least some embodiments of the disclosure, the terminal device transmits the PUCCH bearing each type of UCI according to the multiple maximum code rates corresponding to the multiple types of UCI respectively, so that reliable transmission of all the UCI may be ensured.

Optionally, in an implementation mode of the first aspect, the maximum code rate for transmission of the PUCCH may be determined according to at least one of a UCI type, a service corresponding to the UCI, a PUCCH format, a PUCCH resource configuration, a scrambling manner for data corresponding to the UCI or a downlink control channel configuration corresponding to the data corresponding to the UCI.

Optionally, in an implementation mode of the first aspect, the UCI type may include:

at least one of a Hybrid Auto Repeat Request (HARQ) ACKnowledgement (ACK)/Non-ACKnowledgement (NACK), Channel State Information (CSI) or a Service Request (SR).

Optionally, in an implementation mode of the first aspect, the service corresponding to the UCI may include:

at least one of Ultra-Reliable and Low-Latency Communications (URLLC), Enhanced Mobile Broadband (eMBB) or Massive Machine Type Communication (mMTC).

Optionally, in an implementation mode of the first aspect, the downlink control channel configuration may include:

at least one of a Cyclic Redundancy Check (CRC) scrambling manner for a downlink control channel, a search space where the downlink control channel is located, a Control Resource Set (CORESET) where the downlink control channel is located, an aggregation level of the downlink control channel or a downlink control channel format.

Optionally, in an implementation mode of the first aspect, the scrambling manner may include a scrambling sequence initialization parameter.

Optionally, in an implementation mode of the first aspect, before the operation that the terminal device determines the maximum code rate for transmission of the PUCCH from the at least one maximum code rate for transmission of the PUCCH, the method may further include the following operation.

The terminal device receives the at least one maximum code rate, configured by a network device, of the PUCCH.

Optionally, in an implementation mode of the first aspect, the operation that the terminal device determines the maximum code rate for transmission of the PUCCH from the at least one maximum code rate for transmission of the PUCCH may include the following operation.

The terminal device determines a minimum value in the maximum code rates corresponding to the multiple types of UCI respectively as the maximum code rate for transmission of the PUCCH.

Optionally, in an implementation mode of the first aspect, the operation that the terminal device determines the UCI born in the PUCCH according to the maximum code rate for transmission of the PUCCH may include the following operation.

The terminal device determines the UCI born in the PUCCH according to the maximum code rate for transmission of the PUCCH and determines to encode at least one type of UCI in the multiple types of UCI according to the maximum code rate corresponding to the at least one type of UCI.

Optionally, in an implementation mode of the first aspect, the operation that the terminal device determines the UCI born in the PUCCH according to the maximum code rate for transmission of the PUCCH may include the following operation.

The terminal device determines the UCI born in the PUCCH according to the maximum code rate for transmission of the PUCCH and a priority of the UCI.

According to a second aspect, at least some embodiments of the disclosure provide a PUCCH transmission method, which may include the following operations.

A network device determines a maximum code rate for transmission of a PUCCH from at least one maximum code rate of the PUCCH.

The network device determines UCI born in the PUCCH according to the maximum code rate for transmission of the PUCCH.

In such a manner, in the PUCCH transmission method of at least some embodiments of the disclosure, the network device determines the UCI born in the PUCCH according to the maximum code rate for transmission of the PUCCH, so that a terminal device may transmit the PUCCH within a controllable bit rate range, reliable transmission of the UCI born in the PUCCH may further be ensured, and meanwhile, system transmission efficiency may be improved.

Optionally, in an implementation mode of the second aspect, the operation that the network device determines the maximum code rate for transmission of the PUCCH from the at least one maximum code rate of the PUCCH may include the following operation.

The network device determines one maximum code rate for transmission of the PUCCH from the at least one maximum code rate of the PUCCH, all the UCI born in the PUCCH corresponding to one maximum code rate.

Optionally, in an implementation mode of the second aspect, the operation that the network device determines the maximum code rate for transmission of the PUCCH from the at least one maximum code rate of the PUCCH may include the following operation.

The network device determines multiple maximum code rates for transmission of the PUCCH from the at least one maximum code rate of the PUCCH, multiple types of UCI born in the PUCCH corresponding to multiple maximum code rates respectively.

Optionally, in an implementation mode of the second aspect, the maximum code rate for transmission of the PUCCH may be determined according to at least one of a UCI type, a service corresponding to the UCI, a PUCCH format, a PUCCH resource configuration, a scrambling manner for data corresponding to the UCI or a downlink control channel configuration corresponding to the data corresponding to the UCI.

Optionally, in an implementation mode of the second aspect, the UCI type may include:

at least one of a HARQ ACK/NACK, CSI and an SR.

Optionally, in an implementation mode of the second aspect, the service corresponding to the UCI may include:

at least one of URLLC, eMBB and mMTC.

Optionally, in an implementation mode of the second aspect, the downlink control channel configuration may include:

at least one of a CRC scrambling manner for a downlink control channel, a search space where the downlink control channel is located, a CORESET where the downlink control channel is located, an aggregation level of the downlink control channel or a downlink control channel format.

Optionally, in an implementation mode of the second aspect, the scrambling manner may include a scrambling sequence initialization parameter.

Optionally, in an implementation mode of the second aspect, before the operation that the network device determines the maximum code rate for transmission of the PUCCH from the at least one maximum code rate for transmission of the PUCCH, the network device may further be configured to configure the at least one maximum code rate of the PUCCH.

Optionally, in an implementation mode of the second aspect, the operation that the network device determines the maximum code rate for transmission of the PUCCH from the at least one maximum code rate for transmission of the PUCCH may include the following operation.

The network device determines a minimum value in the maximum code rates corresponding to the multiple types of UCI respectively as the maximum code rate for transmission of the PUCCH.

Optionally, in an implementation mode of the second aspect, the operation that the network device determines the UCI born in the PUCCH according to the maximum code rate for transmission of the PUCCH may include the following operation.

The network device determines the UCI born in the PUCCH according to the maximum code rate for transmission of the PUCCH and determines to encode at least one type of UCI in the multiple types of UCI according to the maximum code rate corresponding to the at least one type of UCI.

Optionally, in an implementation mode of the second aspect, the operation that the network device determines the UCI born in the PUCCH according to the maximum code rate for transmission of the PUCCH may include the following operation.

The network device determines the UCI born in the PUCCH according to the maximum code rate for transmission of the PUCCH and a priority of the UCI.

According to a third aspect, at least some embodiments of the disclosure provide a terminal device, which may include modules or units executing the method in the first aspect or any optional implementation mode of the first aspect.

According to a fourth aspect, at least some embodiments of the disclosure provide a network device, which may include modules or units executing the method in the second aspect or any optional implementation mode of the second aspect.

A fifth aspect provides a terminal device, which includes a processor, a memory and a communication interface. The processor is connected with the memory and the communication interface. The memory is configured to store an instruction, the processor is configured to execute the instruction, and the communication interface is configured for communication with another network element under control of the processor. When the processor executes the instruction stored in the memory, such execution enables the processor to execute the method in the first aspect or any possible implementation mode of the first aspect.

A sixth aspect provides a network device, which includes a processor, a memory and a communication interface. The processor is connected with the memory and the communication interface. The memory is configured to store an instruction, the processor is configured to execute the instruction, and the communication interface is configured for communication with another network element under control of the processor. When the processor executes the instruction stored in the memory, such execution enables the processor to execute the method in the second aspect or any possible implementation mode of the second aspect.

A seventh aspect provides a computer storage medium, in which a program code is stored, the program code including an instruction configured to instruct a computer to execute the method in the first aspect or any possible implementation mode of the first aspect.

An eighth aspect provides a computer storage medium, in which a program code is stored, the program code including an instruction configured to instruct a computer to execute the method in the second aspect or any possible implementation mode of the second aspect.

A ninth aspect provides a computer program product including an instruction, which runs in a computer to enable the computer to execute the method in each aspect FIG. 1 illustrates a wireless communication system 100 to which at least some embodiments of the disclosure are applied. The wireless communication system 100 may include a network device 110. The network device 110 may be a device communicating with a terminal device. The network device 110 may provide communication coverage for a specific geographical region and may communicate with a terminal device (for example, User Equipment (UE)) in the coverage. Optionally, the network device may be a Base Transceiver Station (BTS) in the GSM or the CDMA system, may also be a NodeB (NB) in the WCDMA system, and may further be an Evolutional Node B (eNB or eNodeB) in the LTE system or a wireless controller in a Cloud Radio Access Network (CRAN). Or the network device may be a relay station, an access point, a vehicle-mounted device, a wearable device, a network-side device (for example, a gNB) in a 5G network, a network device in a future evolved Public Land Mobile Network (PLMN) or the like.

The wireless communication system 100 further includes at least one terminal device 120 within the coverage of the network device 110. The terminal device 120 may be mobile or fixed. Optionally, the terminal device 120 may refer to an access terminal, UE, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device, another processing device connected to a wireless modem, a vehicle-mounted device, a wearable device, a terminal device in the 5G network, a terminal device in the future evolved PLMN or the like.

Optionally, the terminal device 120 may perform Device to Device (D2D) communication.

Optionally, the 5G system or network may also be called an NR system or network.

A network device and two terminal devices are exemplarily shown in FIG. 1. Optionally, the wireless communication system 100 may include multiple network devices and another number of terminal devices may be included in coverage of each network device. There are no limits made thereto in at least some embodiments of the disclosure.

Optionally, the wireless communication system 100 may further include another network entity such as a Session Management Function (SMF), Unified Data Management (UDM) and an Authentication Server Function (AUSF). There are no limits made thereto in at least some embodiments of the disclosure.

A wireless communication method provided in at least some embodiments of the disclosure may be applied to a terminal device. The terminal device includes a hardware layer, an operating system layer running on the hardware layer and an application layer running on the operating system layer. The hardware layer includes hardware such as a Central Processing Unit (CPU), a Memory Management Unit (MMU) and a memory (also called a main memory). An operating system may be any one or more computer operating systems implementing service processing through processes, for example, a Linux operating system, a Unix operating system, an Android operating system, an iOS operating system or a windows operating system. The application layer includes an application such as a browser, a contact list, word processing software and instant messaging software.

In addition, each aspect or characteristic of the application may be implemented into a method, a device or a product programmed with a standard and/or using an engineering technology. Term "product" used in the application covers a computer program which may be accessed from any computer-readable device, carrier or medium. For example, the computer-readable medium may include, but not limited to: a magnetic storage device (for example, a hard disk, a floppy disk or a magnetic tape), an optical disk (for example, a Compact Disc (CD) and a Digital Versatile Disc (DVD)), a smart card and a flash memory (for example, an Erasable Programmable Read-Only Memory (EPROM), a card, a stick or a key driver). In addition, various storage media described in the disclosure may represent one or more devices and/or other machine-readable media configured to store information. Term "machine-readable medium" may include, but not limited to, various media capable of storing, including and/or bearing instructions and/or data.

It is to be understood that terms "system" and "network" in the disclosure may usually be exchanged in the disclosure. In the disclosure, term "and/or" is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

Figure 2:
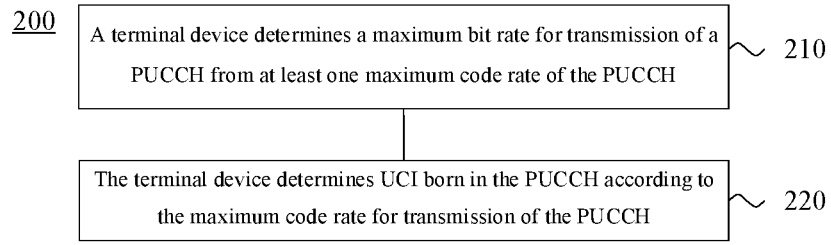
FIG. 2 is a schematic flowchart of a PUCCH transmission method according to an embodiment of the disclosure.

FIG. 2 is a schematic flowchart of a PUCCH transmission method 200 according to an embodiment of the disclosure. As shown in FIG. 2, the method 200 may be executed by a terminal device, the terminal device may be the terminal device shown in FIG. 1, and a network device in the method 200 may be the network device shown in FIG. 1. The method 200 includes the following contents.

In 210, the terminal device determines a maximum code rate for transmission of a PUCCH from at least one maximum code rate of the PUCCH.

Optionally, the maximum code rate of the PUCCH is configured to restrict transmission of the PUCCH.

Optionally, the at least one maximum code rate of the PUCCH is related to at least one of a UCI type, a service corresponding to UCI, a PUCCH format, a PUCCH resource configuration, a scrambling manner for data corresponding to the UCI or a downlink control channel configuration corresponding to the data corresponding to the UCI.

For example, the maximum code rate for transmission of the PUCCH is determined according to at least one of the UCI type, the service corresponding to the UCI, the PUCCH format, the PUCCH resource configuration, the scrambling manner for the data corresponding to the UCI and the downlink control channel configuration corresponding to the data corresponding to the UCI.

Optionally, the UCI type may be at least one of a HARQ ACK character/NACK character, CSI and an SR.

Optionally, the service corresponding to the UCI may be at least one of URLLC, eMBB and mMTC.

Optionally, a priority sequence of UCI of the same service type may be SR/ACK.NACK>CSI.

It is to be understood that the SR, the ACK and the NACK have the same priority class.

Optionally, the CSI may include a Rank Indication (RI), a Precoding Matrix Indicator (PMI) and a Channel Quality Indicator (CQI).

Optionally, the CSI may be one or more of the RI, the CQI and the PMI.

Optionally, the CSI may be divided into Aperiodic CSI (A-CSI), Semi-persistent CSI (S-CSI) and Periodic CSI (P-CSI).

Optionally, the CSI may include broadband information and narrow-band information.

Optionally, priorities may be distinguished in the CSI through the following three principles.

The first principle is: RI>PMI>CQI.

The second principle is: broadband information>narrow-band information.

The third principle is: A-CSI>P-CSI.

Optionally, a priority sequence of the same UCI of multiple service types may be URLLC>eMBB>mMTC.

Optionally, a priority sequence of multiple types of UCI of multiple service types may be determined through the following principles.

The first principle is: service priorities are preferably considered.

Principle 1.1: the priority sequence refers to the service type and the UCI type at first, the priority of the P-CSI being low,
specifically as follows:
URLLC SR/ACK/NACK>URLLC A-CSI>eMBB SR/ACK/NACK>eMBB A-CSI>URLLC S-CSI/P-CSI>eMBB S-CSI/P-CSI.

Principle 1.2: the priority sequence refers to the service type at first,
specifically as follows:
URLLC SR/ACK/NACK>URLLC A-CSI>URLLC S-CSI/P-CSI>eMBB SR/ACK/NACK>eMBB A-CSI>eMBB S-CSI/P-CSI.

Optionally, priority information may be configured by a network device (for example, a base station).

Optionally, the downlink control channel configuration may be at least one of a CRC scrambling manner for a downlink control channel, a search space where the downlink control channel is located, a CORESET where the downlink control channel is located, an aggregation level of the downlink control channel or a downlink control channel format.

It is to be understood that the downlink control channel configuration is a downlink control channel configuration corresponding to the data corresponding to the UCI. For example, the terminal device feeds back a receiving state of data B through UCI, and in such case, the downlink control channel configuration may be configuration information of a downlink control channel bearing downlink control information C indicating the data B.

Optionally, scrambling information of the data may be a scrambling sequence initialization parameter.

Optionally, the at least one maximum code rate may be dynamically configured by the network device. For example, the network device sends configuration information to the terminal device, thereby configuring the at least one maximum code rate.

Optionally, the network device may configure one or more maximum code rates for a downlink control channel.

For example, two maximum code rates corresponding to ACK/NACK and CSI feedback respectively are configured for a downlink control channel.

Two maximum code rates corresponding to a URLLC service and an eMBB service respectively are configured for a downlink control channel.

Two maximum code rates corresponding to a data scrambling manner 1 and a data scrambling manner 2 respectively are configured for a downlink control channel.

Three maximum code rates corresponding to a PUCCH format 2, a PUCCH format 3 and a PUCCH format 4 respectively are configured for a downlink control channel.

Three maximum code rates corresponding to a PUCCH resource 1 and a PUCCH resource 2 respectively are configured for a downlink control channel.

Optionally, the at least one maximum code rate may be configured by the network device based on the PUCCH format. For example, the network device configures maximum code rates for the PUCCH formats 2, 3 and 4 respectively. Optionally, for different PUCCH formats, the same maximum code rate may be configured, or different maximum code rates may be configured.

Optionally, the at least one maximum code rate is preconfigured based on the PUCCH format. For example, one or more maximum code rates are configured for the PUCCH formats 2, 3 and 4 respectively. Optionally, for different PUCCH formats, the same maximum code rate may be configured, or different maximum code rates may be configured.

For example, two maximum code rates corresponding to UCI types CSI and ACK/NACK in the PUCCH format 2 respectively are configured for the PUCCH format 2.

It is to be understood that the CSI and ACK/NACK in the PUCCH format 2 are only examples and may be replaced with other corresponding downlink control channel configurations/service types and/or data scrambling manners. There are no limits made thereto in the application.

Optionally, multiple maximum code rates may correspond to multiple UCI types and/or multiple service types and/or multiple downlink control channel configurations and/or multiple data scrambling manners respectively.

Optionally, the at least one maximum code rate may be configured by the network device based on a PUCCH resource. For example, the network device configures one or more maximum code rates for the PUCCH resource 1 and the PUCCH resource 2 respectively.

Optionally, the at least one maximum code rate is preconfigured based on the PUCCH resource. For example, one or more maximum code rates are pre-configured for the PUCCH resource 1 and the PUCCH resource 2 respectively.

For example, two maximum code rates corresponding to UCI types CSI and ACK/NACK under the PUCCH resource 1 respectively are configured for the PUCCH resource 1.

It is to be understood that the CSI and ACK/NACK under the PUCCH resource 1 are only examples and may be replaced with other corresponding downlink control channel configurations/service types and/or data scrambling manners. There are no limits made thereto in the application.

Optionally, the at least one maximum code rate may also be directly pre-configured.

Optionally, if the network device configures the at least one maximum code rate of the PUCCH, before the operation that the terminal device determines the maximum code rate for transmission of the PUCCH from the at least one maximum code rate for transmission of the PUCCH, the method 200 further includes the following operation.

The terminal device receives the at least one maximum code rate configured by the network device.

Optionally, a maximum code rate may be configured for each type of UCI in multiple types of UCI.

Optionally, the multiple types of UCI may be UCI of multiple types, may also be UCI of multiple services, may also be UCI corresponding to multiple downlink control channel configurations and may also be UCI corresponding to data scrambled in multiple data scrambling manners.

Optionally, the terminal device determines a minimum value in the maximum code rates corresponding to the multiple types of UCI respectively as the maximum code rate for transmission of the PUCCH.

In 220, the terminal device determines UCI born in the PUCCH according to the maximum code rate for transmission of the PUCCH.

Optionally, the terminal device determines the UCI born in the PUCCH according to the maximum code rate for transmission of the PUCCH and determines to encode at least one type of UCI in the multiple types of UCI according to the maximum code rate corresponding to the at least one type of UCI.

Optionally, the terminal device determines the UCI born in the PUCCH according to the maximum code rate for transmission of the PUCCH and a priority of the UCI.

In such a manner, in the PUCCH transmission method of the embodiment of the disclosure, the terminal device may determine the UCI born in the PUCCH according to the maximum code rate for transmission of the PUCCH, so that the terminal device may transmit the PUCCH within a controllable bit rate range, reliable transmission of the UCI born in the PUCCH may further be ensured, and meanwhile, system transmission efficiency may be improved.

Figure 3:
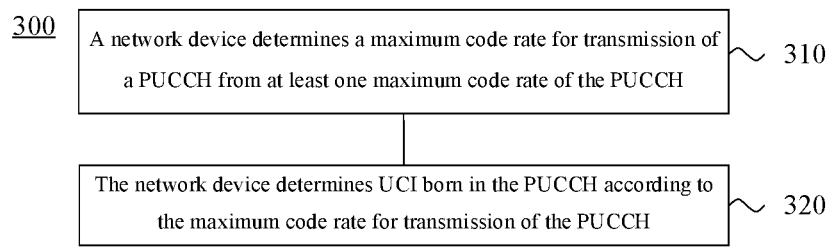
FIG. 3 is a schematic flowchart of another PUCCH transmission method according to an embodiment of the disclosure.

FIG. 3 is a schematic flowchart of a PUCCH transmission method 300 according to an embodiment of the disclosure. As shown in FIG. 3, the method 300 may be executed by a network device, the network device may be the network device shown in FIG. 1, and a terminal device in the method 300 may be the terminal device shown in FIG. 1. The method 300 includes the following contents.

In 310, a network device determines a maximum code rate for transmission of a PUCCH from at least one maximum code rate of the PUCCH.

In 320, the network device determines UCI born in the PUCCH according to the maximum code rate for transmission of the PUCCH.

Optionally, the operation that the network device determines the maximum code rate for transmission of the PUCCH from the at least one maximum code rate of the PUCCH includes the following operation.

The network device determines one maximum code rate for transmission of the PUCCH from the at least one maximum code rate of the PUCCH, all the UCI born in the PUCCH corresponding to one maximum code rate.

Optionally, the operation that the network device determines the maximum code rate for transmission of the PUCCH from the at least one maximum code rate of the PUCCH includes the following operation.

The network device determines multiple maximum code rates for transmission of the PUCCH from the at least one maximum code rate of the PUCCH, multiple types of UCI born in the PUCCH corresponding to multiple maximum code rates respectively.

Optionally, the at least one maximum code rate of the PUCCH is determined according to at least one of a UCI type, a service corresponding to UCI, a PUCCH format, a PUCCH resource configuration, a scrambling manner for data corresponding to the UCI or a downlink control channel configuration corresponding to the data corresponding to the UCI.

Optionally, the UCI type includes:

at least one of a HARQ ACK/NACK, CSI and an SR.

Optionally, the service corresponding to the UCI includes:

at least one of URLLC, eMBB and mMTC.

Optionally, the downlink control channel configuration includes:

at least one of a CRC scrambling manner for a downlink control channel, a search space where the downlink control channel is located, a CORESET where the downlink control channel is located, an aggregation level of the downlink control channel or a downlink control channel format.

Optionally, the scrambling manner includes a scrambling sequence initialization parameter.

Optionally, before the operation that the network device determines the maximum code rate for transmission of the PUCCH from the at least one maximum code rate for transmission of the PUCCH, the network device is further configured to configure the at least one maximum code rate of the PUCCH.

Optionally, the operation that the network device determines the maximum code rate for transmission of the PUCCH from the at least one maximum code rate for transmission of the PUCCH includes the following operation.

The network device determines a minimum value in the maximum code rates corresponding to the multiple types of UCI respectively as the maximum code rate for transmission of the PUCCH.

Optionally, the operation that the network device determines the UCI born in the PUCCH according to the maximum code rate for transmission of the PUCCH includes the following operation.

The network device determines the UCI born in the PUCCH according to the maximum code rate for transmission of the PUCCH and determines to encode at least one type of UCI in the multiple types of UCI according to the maximum code rate corresponding to the at least one type of UCI.

Optionally, the operation that the network device determines the UCI born in the PUCCH according to the maximum code rate for transmission of the PUCCH includes the following operation.

The network device determines the UCI born in the PUCCH according to the maximum code rate for transmission of the PUCCH and a priority of the UCI.

It is to be understood that the operations in the PUCCH transmission method 300 may refer to descriptions about the corresponding operations in the PUCCH transmission method 200 and, for simplicity, will not be elaborated herein.

In such a manner, in the PUCCH transmission method of the embodiment of the disclosure, the network device may determine the UCI born in the PUCCH according to the maximum code rate for transmission of the PUCCH, so that the terminal device may transmit the PUCCH within a controllable bit rate range, reliable transmission of the UCI born in the PUCCH may further be ensured, and meanwhile, system transmission efficiency may be improved.

Optionally, as an embodiment, the network device may configure two maximum code rates, recorded as Rmax1 and Rmax2 respectively, of the PUCCH, and Rmax1 and Rmax2 correspond to URLLC and eMBB services respectively.

Optionally, the network device configures two maximum code rates of the PUCCH.

Optionally, the network device configures two maximum code rates of the PUCCH based on the PUCCH format.

Optionally, the network device configures two maximum code rates of the PUCCH based on a PUCCH resource.

Optionally, the network device configures two maximum code rates of the PUCCH based on scrambling information of the data corresponding to the UCI respectively.

Optionally, the network device configures two maximum code rates of the PUCCH based on scrambling information of the downlink control channel configuration corresponding to the data corresponding to the UCI respectively.

When the terminal device feeds back the UCI, the UCI born in the PUCCH and a coding manner are determined according to the UCI required to be fed back, the maximum code rate corresponding to the service corresponding to the UCI and the PUCCH resource.

1) Specifically, the terminal device is required to feed back an N-bit ACK/NACK, the N-bit ACK/NACK is for a URLLC service, and meanwhile, a PUCCH resource capable of bearing M bits is configured, N being a positive integer greater than 0 and M being a positive integer greater than 0.

Optionally, the network device configures the PUCCH resource capable of bearing the M bits for the terminal device.

Optionally, the PUCCH resource capable of bearing the M bits is pre-configured.

It is to be understood that N/M is a preset bit rate according to which the terminal device transmits the PUCCH bearing the UCI.

When N/M<=Rmax1, the terminal device codes and transmits the N-bit ACK/NACK according to a bit rate less than or equal to Rmax1.

When N/M>Rmax1, the terminal device implements coding and transmission in an ACK/NACK compression manner (for example, ACK/NACK bundling or ACK/NACK multiplexing) and/or an ACK/NACK discarding manner (for example, a discarding principle may be determining according to a time/frequency-domain sequence of the service, a service arriving earlier has a high priority and the service with the high priority is not discarded).

2) Specifically, the terminal device is required to feed back an N-bit ACK/NACK, the N-bit ACK/NACK is for eMBB, and meanwhile, a PUCCH resource capable of bearing M bits is configured.

When N/M<=Rmax2, the terminal device codes and transmits the N-bit ACK/NACK according to a bit rate less than or equal to Rmax2.

When N/M>Rmax2, the terminal device implements coding and transmission in the ACK/NACK compression manner (for example, ACK/NACK bundling or ACK/NACK multiplexing) and/or the ACK/NACK discarding manner (for example, the discarding principle may be determining according to a time/frequency-domain sequence of the service, a service arriving earlier has a high priority and the service with the high priority is not discarded).

Optionally, when a feedback is required to be given only for the eMBB service, no reference to a requirement of a lowest bit rate is required (in such case, the lowest bit rate is the minimum value in the multiple maximum code rates).

3) Specifically, the terminal device is required to feed back an N-bit ACK/NACK, the N-bit ACK/NACK includes an $N_1$-bit ACK/NACK for URLLC and an $N_2$-bit ACK/NACK for eMBB, and meanwhile, a PUCCH resource capable of bearing M bits is configured, Rmax1<Rmax2.

The following two transmission manners may specifically be adopted.

A first manner

When N/M<=Rmax1, the terminal device codes and transmits the N-bit ACK/NACK according to a bit rate less than or equal to Rmax1.

When N/M>Rmax1, the terminal device implements coding and transmission in a partial or complete ACK/NACK compression manner (for example, the partial ACK/NACK compression manner refers to that the $N_1$-bit ACK/NACK for URLLC is not compressed and the $N_2$-bit ACK/NACK for eMBB is compressed) and/or the ACK/NACK discarding manner (for example, the discarding principle may be determining according to a priority sequence of the services, a priority of URLLC is higher than a priority of eMBB, and the service with a high priority is not discarded).

A second manner

When $N_1*Rmax1+N_2*Rmax1<=M$, the terminal device codes and transmits the N-bit ACK/NACK according to a bit rate less than or equal to Rmax1.

When $N_1*Rmax1+N_2*Rmax2<=M$ and $N_1*Rmax1+N_2*Rmax1>M$, the terminal device codes and transmits the $N_1$-bit ACK/NACK according to a bit rate less than or equal to Rmax1 and codes and transmits the $N_2$-bit ACK/NACK according to a bit rate less than or equal to Rmax2.

When $N_1*Rmax1+N_2*Rmax2>M$, the terminal device implements coding and transmission in the partial or complete ACK/NACK compression manner (for example, the partial ACK/NACK compression manner refers to that the $N_1$-bit ACK/NACK for URLLC is not compressed and the $N_2$-bit ACK/NACK for eMBB is compressed) and/or the ACK/NACK discarding manner (for example, the discarding principle may be determining according to the priority sequence of the services, the priority of URLLC is higher than the priority of eMBB, and the service with a high priority is not discarded).

Optionally, that the priority of URLLC is higher than the priority of eMBB may be pre-configured or predetermined.

Optionally, as an embodiment, the network device may configure two maximum code rates, recorded as Rmax1 and Rmax2 respectively, of the PUCCH, and Rmax1 and Rmax2 correspond to ACK/NACK and CSI services respectively.

Optionally, the network device dynamically configures two maximum code rates of the PUCCH.

Optionally, the network device configures two maximum code rates of the PUCCH based on the PUCCH format.

Optionally, the network device configures two maximum code rates of the PUCCH based on a PUCCH resource set.

When the terminal device feeds back the UCI, the UCI born in the PUCCH and a coding manner are determined according to the UCI required to be fed back, the maximum code rate corresponding to the service corresponding to the UCI and the PUCCH resource.

1) Specifically, the terminal device is required to feed back N-bit UCI, the N-bit ACK/NACK includes an N1-bit ACK/NACK and $N_2$-bit CSI, and meanwhile, a PUCCH resource capable of bearing M bits is configured, Rmax1<Rmax2.

The following two transmission manners may specifically be adopted.

A first manner

When N/M<=Rmax1, the terminal device codes and transmits the N-bit UCI according to a bit rate less than or equal to Rmax1.

When N/M>Rmax1, the terminal device implements coding and transmission in a partial or complete UCI compression manner (for example, the partial UCI compression manner refers to that the $N_1$-bit ACK/NACK is not compressed and the $N_2$-bit CSI is compressed) and/or a UCI discarding manner (for example, a discarding principle may be determining according to a priority sequence of the services, a priority of the ACK/NACK is higher than a priority of the CSI, and the service with a high priority is not discarded).

A second manner

When $N_1*Rmax1+N_2*Rmax1<=M$, the terminal device codes and transmits the N-bit UCI according to a bit rate less than or equal to Rmax1.

When $N_1*Rmax1+N_2*Rmax2<=M$ and $N_1*Rmax1+N_2*Rmax1>M$, the terminal device codes and transmits the $N_1$-bit ACK/NACK according to a bit rate less than or equal to Rmax1 and codes and transmits the $N_2$-bit CSI according to a bit rate less than or equal to Rmax2.

When $N_1*Rmax1+N_2*Rmax2>M$, the terminal device implements coding and transmission in the partial or complete UCI compression manner (for example, the partial UCI compression manner refers to that the $N_1$-bit ACK/NACK is not compressed and the $N_2$-bit CSI is compressed) and/or the UCI discarding manner (for example, the discarding principle may be determining according to the priority sequence of the services, the priority of the ACK/NACK is higher than the priority of the CSI, and the service with a high priority is not discarded).

Optionally, that the priority of the ACK/NACK is higher than the priority of the CSI may be pre-configured or predetermined.

Optionally, as an embodiment, the network device may configure four maximum code rates, recorded as Rmax1, Rmax2, Rmax3 and Rmax4 respectively, of the PUCCH, and Rmax1, Rmax2, Rmax3 and Rmax4 correspond to a URLLC ACK/NACK, an eMBB ACK/NACK, URLLC CSI and eMBB CSI services respectively.

Optionally, the network device dynamically configures four maximum code rates of the PUCCH.

Optionally, the network device configures four maximum code rates of the PUCCH based on the PUCCH format.

Optionally, the network device configures four maximum code rates of the PUCCH based on a PUCCH resource.

When the terminal device feeds back the UCI, the UCI born in the PUCCH and a coding manner are determined according to the UCI required to be fed back, the maximum code rate corresponding to the service corresponding to the UCI and the PUCCH resource.

Specifically, the terminal device is required to feed back N-bit UCI, and the N-bit UCI not only includes an ACK/NACK and CSI but also corresponds to URLLC and eMBB. In such case, the terminal device implements coding and transmission in the partial or complete UCI compression manner (for example, a compression principle is that the service with a high priority is not compressed and the service with a low priority is compressed, and a priority sequence of the services may be URLLC ACK/NACK>eMBB ACK/NACK>URLLC CSI>eMBB CSI) and/or the UCI discarding manner (for example, a discarding principle may be determining according to a priority sequence of the services, the priority sequence of the services may be URLLC ACK/NACK>eMBB ACK/NACK>URLLC CSI>eMBB CSI, and the service with a high priority is not discarded).

Optionally, the priority sequence URLLC ACK/NACK>eMBB ACK/NACK>URLLC CSI>eMBB CSI of the services may be pre-configured or predetermined.

Optionally, in the three optional embodiments, the network device directly configures the maximum code rate of the PUCCH, and of course, the maximum code rate of the PUCCH may also be predetermined in a protocol.

Figure 4:
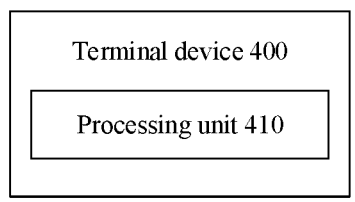
FIG. 4 is a schematic block diagram of a terminal device according to an embodiment of the disclosure.

FIG. 4 is a schematic block diagram of a terminal device 400 according to an embodiment of the disclosure. As shown in FIG. 4, the terminal device 400 includes a processing unit 410.

The processing unit 410 is configured to determine a maximum code rate for transmission of a PUCCH from at least one maximum code rate of the PUCCH.

The processing unit 410 is further configured to determine UCI born in the PUCCH according to the maximum code rate for transmission of the PUCCH.

Optionally, the processing unit 410 is further configured to determine one maximum code rate for transmission of the PUCCH from the at least one maximum code rate of the PUCCH, all the UCI born in the PUCCH corresponding to one maximum code rate.

Optionally, the processing unit 410 is further configured to determine multiple maximum code rates for transmission of the PUCCH from the at least one maximum code rate of the PUCCH, multiple types of UCI born in the PUCCH corresponding to multiple maximum code rates respectively.

Optionally, the at least one maximum code rate of the PUCCH is determined according to at least one of a UCI type, a service corresponding to UCI, a PUCCH format, a PUCCH resource configuration, a scrambling manner for data corresponding to the UCI or a downlink control channel configuration corresponding to the data corresponding to the UCI.

Optionally, the UCI type includes:

at least one of a HARQ ACK/NACK, CSI and an SR.

Optionally, the service corresponding to the UCI includes:

at least one of URLLC, eMBB and mMTC.

Optionally, the downlink control channel configuration includes:

at least one of a CRC scrambling manner for a downlink control channel, a search space where the downlink control channel is located, a CORESET where the downlink control channel is located, an aggregation level of the downlink control channel or a downlink control channel format.

Optionally, the scrambling manner includes a scrambling sequence initialization parameter.

Optionally, before the processing unit 410 determines the maximum code rate for transmission of the PUCCH from the at least one maximum code rate for transmission of the PUCCH, the terminal device 400 further includes a receiving unit 420.

The receiving unit 420 is configured to receive the at least one maximum code rate configured by a network device.

Optionally, the processing unit 410 is further configured to determine a minimum value in the maximum code rates corresponding to the multiple types of UCI respectively as the maximum code rate for transmission of the PUCCH.

Optionally, the processing unit 410 is further configured to determine the UCI born in the PUCCH according to the maximum code rate for transmission of the PUCCH and determine to encode at least one type of UCI in the multiple types of UCI according to the maximum code rate corresponding to the at least one type of UCI.

Optionally, the processing unit 410 is further configured to determine the UCI born in the PUCCH according to the maximum code rate for transmission of the PUCCH and a priority of the UCI.

It is to be understood that the terminal device 400 according to the embodiment of the disclosure may correspond to the terminal device in the method 200 of the application and the abovementioned and other operations and/or functions of each unit in the terminal device 400 are adopted to implement the corresponding flows executed by the terminal device in the method 200 shown in FIG. 2 respectively and will not be elaborated herein for simplicity.

Figure 5:
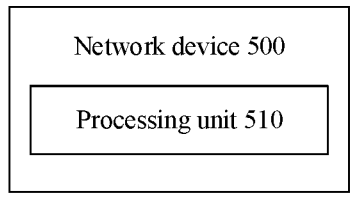
FIG. 5 is a schematic block diagram of a network device according to an embodiment of the disclosure.

FIG. 5 is a schematic block diagram of a network device 500 according to an embodiment of the disclosure. As shown in FIG. 5, the network device 500 includes a processing unit 510.

The processing unit 510 is configured to determine a maximum code rate for transmission of a PUCCH from at least one maximum code rate of the PUCCH.

The processing unit 510 is further configured to determine UCI born in the PUCCH according to the maximum code rate for transmission of the PUCCH.

Optionally, the processing unit 510 is further configured to determine one maximum code rate for transmission of the PUCCH from the at least one maximum code rate of the PUCCH, all the UCI born in the PUCCH corresponding to one maximum code rate.

Optionally, the processing unit 510 is further configured to determine multiple maximum code rates for transmission of the PUCCH from the at least one maximum code rate of the PUCCH, multiple types of UCI born in the PUCCH corresponding to multiple maximum code rates respectively.

Optionally, the at least one maximum code rate of the PUCCH is determined according to at least one of a UCI type, a service corresponding to UCI, a PUCCH format, a PUCCH resource configuration, a scrambling manner for data corresponding to the UCI or a downlink control channel configuration corresponding to the data corresponding to the UCI.

Optionally, the UCI type includes:

at least one of a HARQ ACK/NACK, CSI and an SR.

Optionally, the service corresponding to the UCI includes:

at least one of URLLC, eMBB and mMTC.

Optionally, the downlink control channel configuration includes:

at least one of a CRC scrambling manner for a downlink control channel, a search space where the downlink control channel is located, a CORESET where the downlink control channel is located, an aggregation level of the downlink control channel or a downlink control channel format.

Optionally, the scrambling manner includes a scrambling sequence initialization parameter.

Optionally, before the processing unit 510 determines the maximum code rate for transmission of the PUCCH from the at least one maximum code rate for transmission of the PUCCH, the processing unit 510 is further configured to configure the at least one maximum code rate of the PUCCH.

Optionally, before the processing unit 510 determines the maximum code rate for transmission of the PUCCH from the at least one maximum code rate for transmission of the PUCCH, the terminal device 400 further includes a receiving unit 520.

The receiving unit 520 is configured to receive the at least one maximum code rate configured by a network device.

Optionally, the processing unit 510 is further configured to determine a minimum value in the maximum code rates corresponding to the multiple types of UCI respectively as the maximum code rate for transmission of the PUCCH.

Optionally, the processing unit 510 is further configured to determine the UCI born in the PUCCH according to the maximum code rate for transmission of the PUCCH and determine to encode at least one type of UCI in the multiple types of UCI according to the maximum code rate corresponding to the at least one type of UCI.

Optionally, the processing unit 510 is further configured to determine the UCI born in the PUCCH according to the maximum code rate for transmission of the PUCCH and a priority of the UCI.

It is to be understood that the network device 500 according to the embodiment of the disclosure may correspond to the network device in the method 300 of the application and the abovementioned and other operations and/or functions of each unit in the network device 500 are adopted to implement the corresponding flows executed by the network device in the method 300 shown in FIG. 3 respectively and will not be elaborated herein for simplicity.

Figure 6:
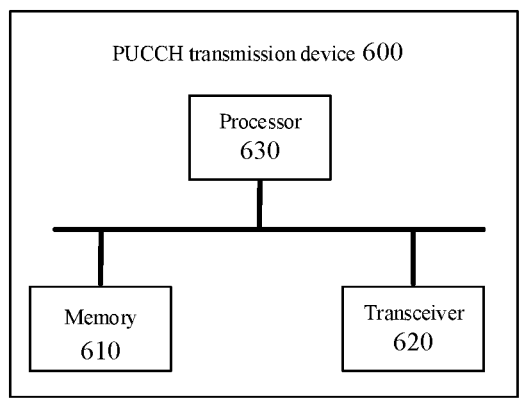
FIG. 6 is a schematic block diagram of a PUCCH transmission device according to an embodiment of the disclosure.

FIG. 6 is a schematic block diagram of a PUCCH transmission device 600 according to an embodiment of the disclosure. The device 600 includes a memory 610, a transceiver 620 and a processor 630.

The memory 610 is configured to store a program, the program including a code.

The transceiver 620 is configured to communicate with another device.

The processor 630 is configured to execute the program code in the memory 610.

Optionally, when the code is executed, the processor 630 may implement each operation executed by a terminal device in the method 200 in FIG. 2. For simplicity, no more elaborations will be made herein. In such case, the device 600 may be a terminal device (for example, a mobile phone). The transceiver 620 is configured to execute specific signal transmission and reception under driving of the processor 630.

Optionally, when the code is executed, the processor 630 may further implement each operation executed by a network device in the method 300 in FIG. 3. For simplicity, no more elaborations will be made herein. In such case, the device 600 may be a network device (for example, an access network device or a core network device).

It is to be understood that, in the embodiment of the disclosure, the processor 630 may be a CPU and the processor 630 may also be another universal processor, a Digital Signal Processor (DSP), an Application Specific Integrated Circuit (ASIC), a Field Programmable Gate Array (FPGA) or another programmable logic device, discrete gate or transistor logic device and discrete hardware component and the like. The universal processor may be a microprocessor or the processor may also be any conventional processor and the like.

The memory 610 may include a Read-Only Memory (ROM) and a Random Access Memory (RAM) and provides an instruction and data for the processor 630. A part of the memory 610 may further include a nonvolatile RAM. For example, the memory 610 may further store information of a device type.

The transceiver 620 may be configured to realize signal sending and receiving functions, for example, frequency modulation and demodulation functions or up-conversion and down-conversion functions.

In an implementation process, at least one operation of the method may be completed through an integrated logical circuit of hardware in the processor 630, or the integrated logical circuit may complete the at least one operation under driving of an instruction in a software form. Therefore, the PUCCH transmission device 600 may be a chip or a chip set. The operations of the method disclosed in combination with at least some embodiments of the disclosure may be directly embodied to be executed and completed by a hardware processor or executed and completed by a combination of hardware and software modules in the processor. The software module may be located in a mature storage medium in this field such as a RAM, a flash memory, a ROM, a Programmable ROM (PROM) or Electrically Erasable PROM (EEPROM) and a register. The storage medium is located in the memory, and the processor 630 reads information in the memory, and completes the operations of the methods in combination with hardware. No more detailed descriptions will be made herein to avoid repetitions.

Figure 7:
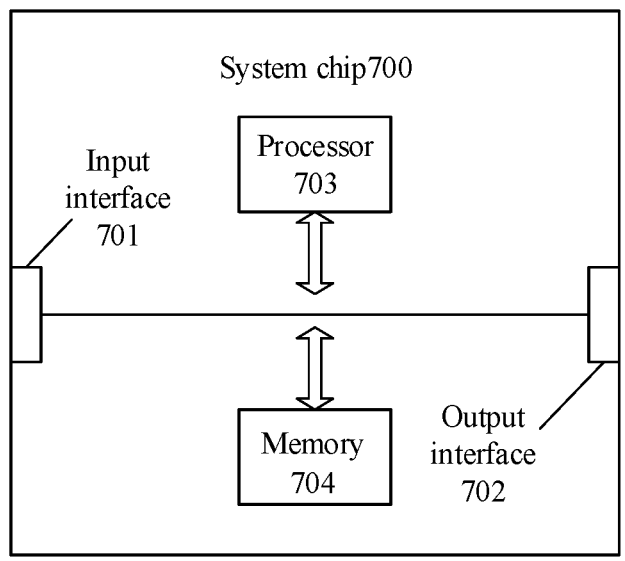
FIG. 7 is a schematic structure diagram of a system chip according to an embodiment of the disclosure.

FIG. 7 is a schematic structure diagram of a system chip 700 according to an embodiment of the disclosure. The system chip 700 of FIG. 7 includes an input interface 701, output interface 702, processor 703 and memory 704 which may be connected through an internal communication connecting line. The processor 703 is configured to execute a code in the memory 704.

Optionally, when the code is executed, the processor 703 implements methods executed by a terminal device in the method embodiments. For simplicity, elaborations are omitted herein.

Optionally, when the code is executed, the processor 703 implements methods executed by a network device in the method embodiments. For simplicity, elaborations are omitted herein.

Those of ordinary skill in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the application.

Those skilled in the art may clearly learn about that specific working processes of the system, device and unit described above may refer to the corresponding processes in the method embodiment and will not be elaborated herein for convenient and brief description.

In some embodiments provided by the application, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the disclosure may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the application substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the operations of the method in each embodiment of the disclosure. The storage medium includes: various media capable of storing program codes such as a U disk, a mobile hard disk, a ROM, a RAM, a magnetic disk or an optical disk.

The above is only the specific implementation mode of the application and not intended to limit the scope of protection of the application. Any variations or replacements apparent to those skilled in the art within the technical scope disclosed by the application shall fall within the scope of protection of the application. Therefore, the scope of protection of the application shall be subject to the scope of protection of the claims.

The invention claimed is:

1. A method for Physical Uplink Control Channel (PUCCH) transmission, comprising:
   obtaining, by a terminal device, a maximum code rate, wherein the maximum code rate is one of at least two maximum code rates configured for PUCCH transmission;
   transmitting, by the terminal device, Uplink Control Information (UCI) in a PUCCH according to the maximum code rate; and
   before obtaining, by the terminal device, the maximum code rate, receiving, by the terminal device, the at least two maximum code rates, configured by a network device for the PUCCH transmission.

2. The method of claim 1, wherein the maximum code rate is configured for different PUCCH formats.

3. The method of claim 1, wherein the maximum code rate for transmission of the PUCCH is determined according to at least one of: a UCI type, a service corresponding to the UCI, a PUCCH format, a PUCCH resource configuration, a scrambling manner for data corresponding to the UCI or a downlink control channel configuration corresponding to the data corresponding to the UCI.

4. The method of claim 3, wherein the UCI type comprises at least one of:
   a Hybrid Auto Repeat Request (HARQ) ACKnowledgement (ACK)/Non-ACKnowledgement (NACK), Channel State Information (CSI) or a Service Request (SR).

5. The method of claim 3, wherein the downlink control channel configuration comprises at least one of:
   a Cyclic Redundancy Check (CRC) scrambling manner for a downlink control channel, a search space where the downlink control channel is located, a Control Resource Set (CORESET) where the downlink control channel is located, an aggregation level of the downlink control channel or a downlink control channel format.

6. The method of claim 1, wherein transmitting, by the terminal device, the Uplink Control Information (UCI) in a PUCCH according to the maximum code rate comprises:
   determining, by the terminal device, the UCI carried on the PUCCH according to the maximum code rate for the PUCCH transmission and a priority of the UCI.

7. A method for Physical Uplink Control Channel (PUCCH) transmission, comprising:
   configuring, by a network device, a maximum code rate for a terminal device, wherein the maximum code rate is one of at least two maximum code rates configured for PUCCH transmission;
   receiving, by the network device, Uplink Control Information (UCI) transmitted by the terminal device in a PUCCH according to the maximum code rate; and
   before obtaining, by the terminal device, the maximum code rate, receiving, by the terminal device, the at least two maximum code rates, configured by the network device for the PUCCH transmission.

8. The method of claim 7, wherein the maximum code rate is configured for different PUCCH formats.

9. The method of claim 7, wherein the maximum code rate for transmission of the PUCCH is determined according to at least one of: a UCI type, a service corresponding to the UCI, a PUCCH format, a PUCCH resource configuration, a scrambling manner for data corresponding to the UCI or a downlink control channel configuration corresponding to the data corresponding to the UCI.

10. The method of claim 9, wherein the UCI type comprises at least one of:
    a Hybrid Auto Repeat Request (HARQ) ACKnowledgement (ACK)/Non-ACKnowledgement (NACK), Channel State Information (CSI) or a Service Request (SR).

11. The method of claim 9, wherein the downlink control channel configuration comprises at least one of:
    a Cyclic Redundancy Check (CRC) scrambling manner for a downlink control channel, a search space where the downlink control channel is located, a Control Resource Set (CORESET) where the downlink control channel is located, an aggregation level of the downlink control channel or a downlink control channel format.

12. The method of claim 7, wherein before configuring, by the network device, the maximum code rate for the terminal device, the method further comprises:
    configuring, by the network device, the at least two maximum code rates for the PUCCH transmission.

13. The method of claim 7, wherein receiving, by the network device, the Uplink Control Information (UCI) transmitted by the terminal device in a PUCCH according to the maximum code rate comprises:
    determining, by the network device, the UCI carried on the PUCCH according to the maximum code rate for the PUCCH transmission and determining to encode at least one type of UCI in multiple types of UCI according to the maximum code rate corresponding to the at least one type of UCI.

14. A terminal device, comprising:
    a processor, configured to obtain a maximum code rate, wherein the maximum code rate is one of at least two maximum code rates configured for PUCCH transmission; and
    a transceiver, configured to perform communication, wherein
    the processor is further configured to control the transceiver to transmit Uplink Control Information (UCI) in a PUCCH according to the maximum code rate, and
    wherein the transceiver is configured to: before obtaining the maximum code rate, receive the at least two maximum code rates, configured by a network device for the PUCCH transmission.

15. The terminal device of claim 14, wherein the maximum code rate is configured for different PUCCH formats.

16. The terminal device of claim 14, wherein the at least one maximum code rate of the PUCCH is determined according to at least one of: a UCI type, a service corresponding to the UCI, a PUCCH format, a PUCCH resource configuration, a scrambling manner for data corresponding to the UCI or a downlink control channel configuration corresponding to the data corresponding to the UCI.

17. The terminal device of claim 16, wherein the UCI type comprises at least one of:
   a Hybrid Auto Repeat Request (HARQ) ACKnowledgement (ACK)/Non-ACKnowledgement (NACK), Channel State Information (CSI) or a Service Request (SR).

18. The terminal device of claim 16, wherein the downlink control channel configuration comprises at least one of:
   a Cyclic Redundancy Check (CRC) scrambling manner for a downlink control channel, a search space where the downlink control channel is located, a Control Resource Set (CORESET) where the downlink control channel is located, an aggregation level of the downlink control channel or a downlink control channel format.

* * * * *